Figure 1:
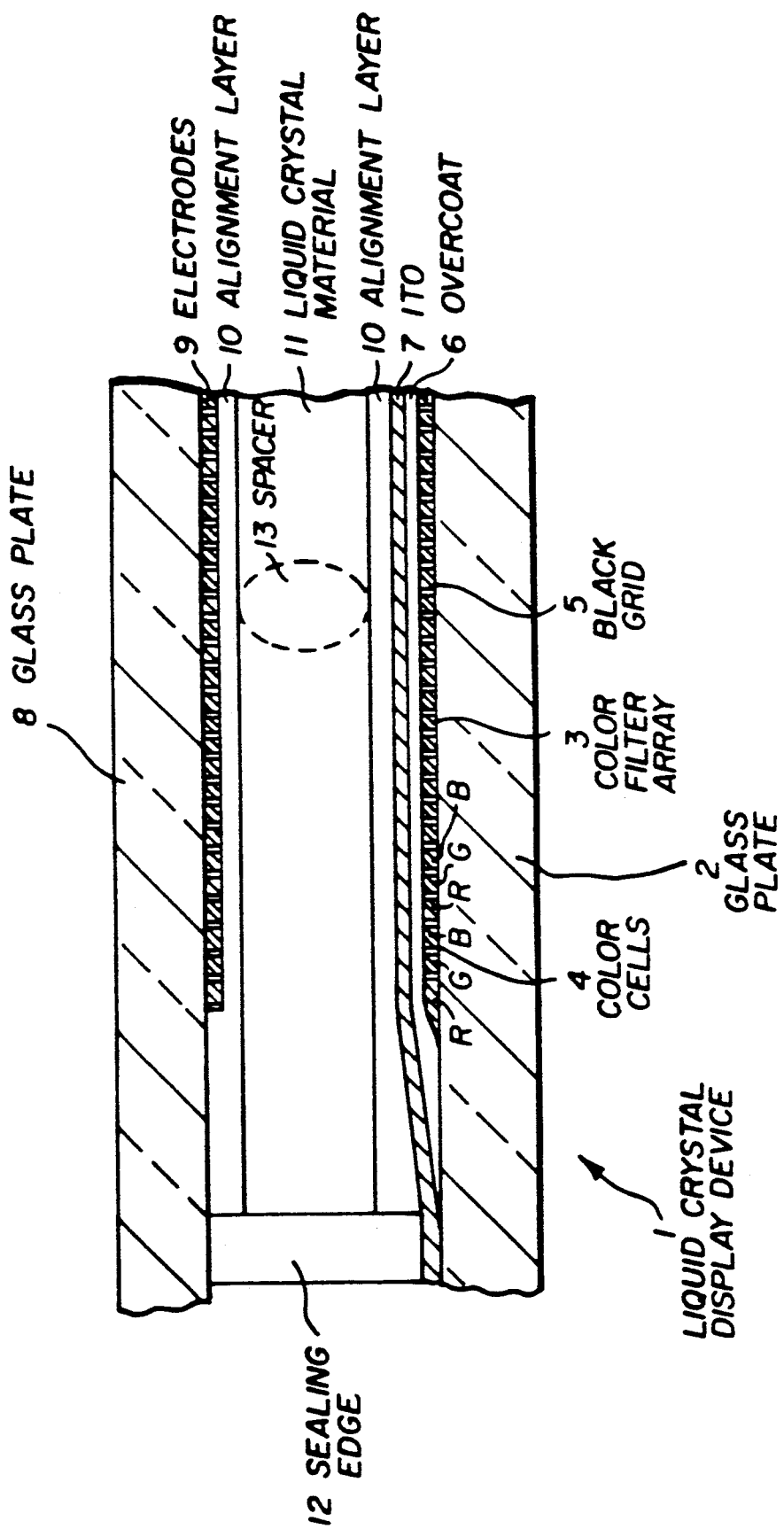

United States Patent [19]

Long et al.

[11] Patent Number: 5,079,214
[45] Date of Patent: Jan. 7, 1992

[54] PATTERNED RECEIVER FOR COLOR FILTER ARRAY

[75] Inventors: Michael E. Long, Penfield, N.Y.; Gerardus C. M. de Keyzer, Eindhoven, Netherlands; Adriaan W. de Bruijn, Eindhoven, Netherlands; Pedro F. Henriette, Eindhoven, Netherlands; Antonius H. M. Raaijmakers, Eindhoven, Netherlands; David L. VanGalio, Brockport, N.Y.

[73] Assignees: Eastman Kodak Company, Rochester; U.S. Philips Corporation, New York, both of N.Y.

[21] Appl. No.: 959,509

[22] Filed: Oct. 11, 1990

[51] Int. Cl.⁵ .................. B41M 5/035; B41M 5/26; G02B 5/22

[52] U.S. Cl. .................................. 503/227; 8/411; 427/265; 428/1; 428/195; 428/210; 428/412; 428/913; 428/914; 430/7; 430/200; 430/201; 359/891; 359/68

[58] Field of Search .................. 8/471; 428/195, 913, 428/914, 1, 210, 412; 427/256, 265; 503/227; 350/311; 430/7, 200, 201, 945

[56] References Cited

U.S. PATENT DOCUMENTS

| | | | |
|---|---|---|---|
| 4,081,277 | 3/1978 | Brault et al. | 96/38.2 |
| 4,786,148 | 11/1988 | Sekimura et al. | 503/227 |
| 4,962,081 | 10/1990 | Harrison et al. | 503/227 |

*Primary Examiner*—Bruce H. Hess
*Attorney, Agent, or Firm*—Harold E. Cole

[57] ABSTRACT

A thermally-transferred color filter array element, preferably for use in a color electro-optical display device such as a color liquid crystal display device, comprising a support having thereon a polymeric dye image-receiving layer containing a thermally-transferred image comprising a repeating pattern of colorants, such as a mosaic pattern, the polymeric dye image-receiving layer having been applied to the support using screen printing.

21 Claims, 1 Drawing Sheet

PATTERNED RECEIVER FOR COLOR FILTER ARRAY

This invention relates to a thermally-transferred color filter array element wherein screen printing is used to coat a support with a polymeric dye image-receiving layer which contains the color filter array. The color filter array element may be used in electro-optical devices such as a color liquid crystal display device.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. In addition, liquid crystal display devices usually have lower power requirements than corresponding cathode ray tube devices.

There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users' needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. This method therefore contains many labor-intensive steps, requires careful alignment, is time-consuming and very costly. Further details of this process are disclosed in U.S. Pat. No. 4,081,277. U.S. Pat. No. 4,786,148 also discloses a color filter array element which employs certain pigments.

Color liquid crystal display devices generally include two spaced glass panels which define a sealed cavity which is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element or pixel. If the device is to have color capability, a color filter array with, e.g., red, green and blue color areas must be aligned with each pixel. Depending upon the image to be displayed, one or more of the pixel electrodes is energized during display operation to allow full light, no light or partial light to be transmitted through the color filter areas associated with that pixel. The image perceived by a user is a blending of colors formed by the transmission of light through adjacent color filter areas.

In forming such a liquid crystal display device, the color filter array element to be used therein may have to undergo rather severe heating and treatment steps during manufacture. For example, a transparent conducting layer, such as indium tin oxide (ITO), is usually vacuum sputtered onto the color filter array element which is then cured and patterned by etching. The curing may take place at temperatures elevated as high as 200° C. for times which may be as long as one hour or more. This is followed by coating with a thin polymeric alignment layer for the liquid crystals, such as a polyimide, followed by another curing step for up to several hours at an elevated temperature. These treatment steps can be very harmful to many color filter array elements, especially those with a gelatin matrix.

In U.S. Pat. No. 4,962,081 polycarbonate dye image-receiving layer materials for color filter array elements are described. In using these materials to form a color filter array element, the polymeric material would typically be coated onto a glass support over the entire surface using spin coating in order to obtain a smooth coating. A thin overcoat layer would then usually be applied thereover to help protect the polymeric receiving layer from the harsh treatment steps which follow.

However, it has been found necessary to not have the coating of the polymeric dye image-receiving layer extend over the entire surface of the glass support used to form the color filter array. Instead, it has been found desirable to coat the polymeric dye image-receiving material in a pattern onto the glass support, just slightly larger than the viewing area of the liquid crystal display device. There are at least two reasons for doing this.

First of all, patterning the receiving layer improves the seal formation between the two plates since there is a glass-to-glass seal, rather than having the polymer in between. The adhesive used to seal the plates together doesn't adhere very well to polymeric materials, which in turn causes the cell to leak.

Secondly, patterning the receiving layer makes it much easier to repair the display device if it becomes necessary. For example, several electronic chips or other electronic hardware are typically located on this plate having the color filter array thereon. The chips are connected via the transparent ITO layer, which has been etched to form a pattern of leads outside the viewing area.

There is not a 100% reliability of placing a given chip on the plate in the proper area. By increasing the number of chips to be so located on the plate, the probability of having at least one chip improperly positioned increases substantially. Rather than discard the whole display device, it is more economic to remove and reposition or replace the chip.

Removing a chip from the fragile ITO layer is easier if the ITO layer is coated directly onto the glass substrate to which it has better adhesion, rather than being coated onto a polymer. When the ITO layer is coated directly onto a polymer, it has poorer adhesion and breaks more readily during the repair process which involves removing an adhesive used to bond the chip to the support in order to remove the chip.

The method for applying the polymeric dye image-receiving material in a pattern onto a support such as glass should result in a smooth coating with edges that have a continuous and smoothly decreasing slope. The slope of the edge is preferably less than 10°. If the edges are undercut or sharp, then the overcoat layer which is applied thereover, usually by a printing technique, becomes discontinuous at that edge eventually causing a break in the ITO layer. For example, if the receiving layer has a sharp edge so that it is not protected by the overcoat layer, then the receiving layer can be attacked by subsequent treatment steps involving the ITO and alignment layers. This in turn leads to the ITO layer becoming improperly etched due to lateral etching caused by improper covering of the sharp edge by the overcoat layer, resulting in a break. When there is a break in the ITO layer, the entire display device must be discarded.

There are many techniques for printing a polymer in a pattern on a support such as flexographic printing, gravure printing, ink jet printing, hopper printing, air brush, spin coating followed by etching, etc. All of these techniques suffer from one or more of the problems discussed above.

Photolithographic etching is a process which is well known and widely used in the art to remove polymeric materials from certain areas of a coating. However, as will be shown hereinafter, use of this process in patterning the receiving layer causes a subsequently applied ITO layer to become discontinuous, so that it would not be useful in a display device.

Flexographic printing is also a common technique used in the art to pattern various layers. However, the layers which are applied in this manner are too thin to provide a sufficient thickness for a dye image-receiving layer used for thermal printing. While multiple passes through the printing press could be used to obtain the proper thickness, this would substantially add to the cost and the multiple deposition of layers has a deleterious effect on the properties of the layer as a whole.

It would be desirable to provide a method of coating a polymeric dye image-receiving material in a pattern onto a support to form a color filter array element which would avoid the disadvantages discussed above. It would also be desirable to provide a thermally-transferred color filter array element employing that method. It would further be desirable to provide an electro-optical display device employing such a color filter array element.

These and other objects are achieved in accordance with this invention which comprises a thermally-transferred color filter array element comprising a support having thereon a polymeric dye image-receiving layer containing a thermally-transferred image comprising a repeating pattern of colorants, the polymeric dye image-receiving layer having been applied to the support using screen printing.

FIG. 1 illustrates a display device in accordance with the invention.

The use of screen printing was found to avoid the problems discussed above, especially the problem of how to provide a coating pattern with a gradual decreasing slope at the edge in order to avoid an electrical failure in the ITO layer which is applied thereover.

Commercially available screen printing machines can be used in the invention such as the Microtronic ® V machine made by the Ekra Company. The mesh count for the screen can be from about 100 to about 500 per cm. The open area for the screen can be from about 20% to about 50%. The thread diameter for the screen can be from about 30 to about 70 $\mu$m. Commercially available screens which can be used include polyester screens from NBC Industries Co. and Advance Process Supply Co. The squeegee for the screen can be rounded, rectangular or square in shape which is used in a dragging motion on the screen.

There are many material and equipment factors which affect the quality of a screen-printed pattern. The coating solution must have a viscosity such that it can penetrate the screen and then flow out to a smooth film on the substrate after printing. Optimization of the viscosity is directly linked to the mesh or fineness of the screen. Additional mechanical factors can play a role such as the angle, rate and pressure of the squeegee and the distance of the screen from the substrate, called the "snap-off distance".

As noted above, the dye image-receiving layer contains a thermally-transferred image comprising a repeating pattern of colorants in the polymeric dye image-receiving layer, preferably a mosaic pattern.

In a preferred embodiment of the invention, the mosaic pattern consists of a set of red, green and blue additive primaries.

In another preferred embodiment of the invention, each area of primary color and each set of primary colors are separated from each other by an opaque area, e.g., black grid lines. This has been found to give improved color reproduction and reduce flare in the displayed image.

The size of the mosaic set is not critical since it depends on the viewing distance. In general, the individual pixels of the set are from about 50 to about 600 $\mu$m and do not have to be of the same size.

In a preferred embodiment of the invention, the repeating mosaic pattern of dye to form the color filter array element consists of uniform, square, linear repeating areas, with one color diagonal displacement as follows:

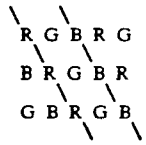

In another preferred embodiment, the above squares are approximately 100 μm.

The color filter array elements prepared according to the invention can be used in image sensors or in various electro-optical devices such as electroscopic light valves or liquid crystal display devices. Such liquid crystal display devices are described, for example, in UK Patents 2,154,355; 2,130,781; 2,162,674 and 2,161,971.

Liquid crystal display devices are commonly made by placing a material, which is liquid crystalline at the operating temperature of the device, between two transparent electrodes, usually indium tin oxide coated on a substrate such as glass, and exciting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

The polymeric alignment layer described above may be any of the materials commonly used in the liquid crystal art. Such materials include polyimides, polyvinyl alcohol, methyl cellulose, etc.

The transparent conducting layer described above is also conventional in the liquid crystal art. Such materials include indium tin oxide, indium oxide, tin oxide, cadmium stannate, etc.

FIG. 1 shows diagrammatically a part of liquid crystal display device 1 having a plate 2 of glass, quartz or other suitable material. A color filter array 3 comprises red(R), green(G) and blue(B) cells 4 corresponding to pixels as prepared according to the method of the invention. Black grid lines 5 separate each color cell. The color filter array 3 is provided with an overcoat layer 6 and a transparent conducting layer of ITO 7.

The other plate 8 has electrodes 9 provided thereon which define pixels, either because the electrodes 9 and the transparent conducting layer of ITO 7 constitute a cross-bar system in which the crossings define the pixels (passive drive), or because the electrodes 9 constitute picture electrodes which are driven by a system (not shown) of switching elements, drive and data lines (active drive), in which case the electrodes 9 may have a single flat structure.

A layer of liquid crystal material 11 is present between the two supporting plates 2 and 8 which is provided with alignment layers 10. The two plates are held at a substantially constant distance from each other by means of a sealing edge 12 and spacers 13. In practice, the device is further provided with polarizers, reflectors, etc. in the conventional manner.

The dye image-receiving layer used in forming the color filter array element of the invention may comprise, for example, those polymers described in U.S. Pat. Nos. 4,695,286, 4,740,797, 4,775,657, and 4,962,081, the disclosures of which are hereby incorporated by reference. In a preferred embodiment, polycarbonates having a glass transition temperature greater than about 200° C. are employed. In another preferred embodiment, polycarbonates derived from a methylene substituted bisphenol-A are employed such as 4,4'-(hexahydro-4,7-methanoindan-5-ylidene)-bisphenol. In general, good results have been obtained at a coverage of from about 0.25 to about 5mg/m$^2$.

The support used in the invention is preferably glass such as borax glass, borosilicate glass, chromium glass, crown glass, flint glass, lime glass, potash glass, silica-flint glass, soda glass, and zinc-crown glass. In a preferred embodiment, borosilicate glass is employed.

A dye-donor element that is used to form the color filter array element of the invention comprises a support having thereon a dye layer. Any dye or mixture of dyes can be used in such a layer provided they are transferable to the dye image-receiving layer of the color array element of the invention by the action of heat. Especially good results have been obtained with sublimable dyes. Examples of sublimable dyes include anthraquinone dyes, e.g., Sumikalon Violet RS ® (Sumitomo Chemical Co., Ltd.), Dianix Fast Violet 3R-FS ® (Mitsubishi Chemical Industries, Ltd.), and Kayalon Polyol Brilliant Blue N-BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ®(Sumitomo Chemical Co., Ltd.), and Miktazol Black 5GH ® (Mitsui Toatsu Chemicals, Inc.); direct dyes such as Direct Dark Green B ® (Mitsubishi Chemical Industries, Ltd.) and Direct Brown M ® and Direct Fast Black D ® (Nippon Kayaku Co. Ltd.); acid dyes such as Kayanol Milling Cyanine 5R ® (Nippon Kayaku Co. Ltd.); basic dyes such as Sumicacryl Blue 6G ® (Sumitomo Chemical Co., Ltd.), and Aizen Malachite Green ® (Hodogaya Chemical Co., Ltd.);

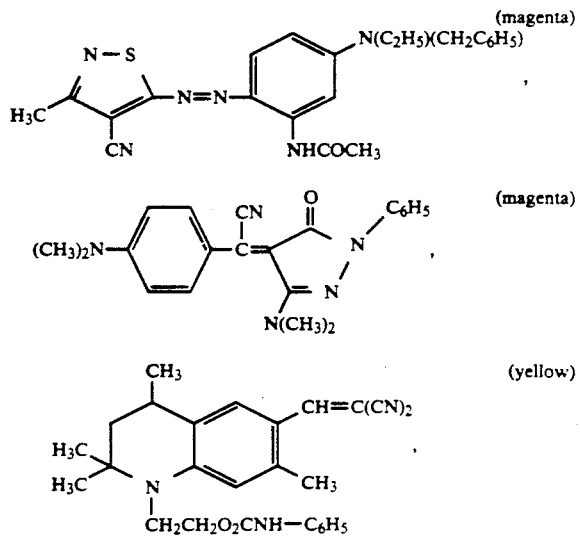

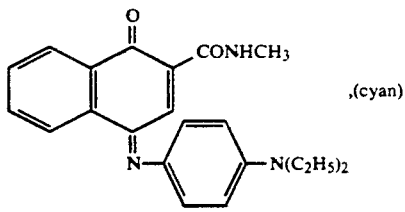, (cyan)

or any of the dyes disclosed in U.S. Pat. Nos. 4,541,830, 4,541,830, 4,698,651, 4,695,287; 4,701,439, 4,757,046, 4,743,582, 4,769,360 and 4,753,922, the disclosures of which are hereby incorporated by reference. The above subtractive dyes may be employed in various combinations to obtain the desired red, blue and green additive primary colors. The dyes may be mixed within the dye layer or transferred sequentially if coated in separate dye layers. The dyes may be used at a coverage of from about 0.05 to about 1 g/m².

Various methods may be used to transfer dye from the dye donor to the transparent support to form the color filter array element of the invention. There may be used, for example, a high intensity light flash technique with a dye-donor containing an energy absorptive material such as carbon black or a light-absorbing dye. Such a donor may be used in conjunction with a mirror which has a grid pattern formed by etching with a photoresist material. This method is described more fully in U.S. Pat. No. 4,923,860.

Another method of transferring dye from the dye donor to the transparent support to form the color filter array element of the invention is to use a heated embossed roller as described more fully in U.S. Pat. No. 4,978,652.

In another embodiment of the invention, the imagewise-heating is done by means of a laser using a dye-donor element comprising a support having thereon a dye layer and an absorbing material for the laser, the imagewise-heating being done in such a way as to produce a repeating mosaic pattern of colorants.

Any material that absorbs the laser energy or high intensity light flash described above may be used as the absorbing material such as carbon black or non-volatile infrared-absorbing dyes or pigments which are well known to those skilled in the art. In a preferred embodiment, cyanine infrared absorbing dyes are employed as described in U.S. Pat. No. 4,973,572.

After the dyes are transferred to the receiver, the image may be treated to further diffuse the dye into the dye-receiving layer in order to stabilize the image. This may be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

The following examples are provided to illustrate the invention.

Example 1

Two polycarbonates as described below were coated onto borosilicate glass using screen printing by hand. Three different screens were employed as follows:

1) A Polystar ® monofilament polyester screen (Advance Process Supply Co.) with a 140 mesh, opening of 115 μm, 42% open area and thread diameter of 63 μm.

2) A Polystar ® monofilament polyester screen (Advance Process Supply Co.) with a 280 mesh, opening of 53 μm, 34% open area and thread diameter of 38 μm.

3) A Polystar ® monofilament polyester screen (Advance Process Supply Co.) with a 390 mesh, opening of 32 μm, 25% open area and thread diameter of 33 μm.

The distance between the screen and the substrate, known as the "snap-off distance" was 4 mm. The squeegee which was employed was a rounded, medium hardness, 70–75 durometer, of rubber (Advance Process Supply Co.).

The polymers which were coated were as follows:

Polycarbonate 1

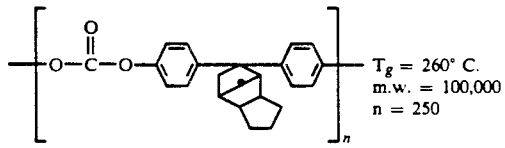

$T_g$ = 260° C.
m.w. = 100,000
n = 250

A polycarbonate derived from 4,4'-(hexahydro-4,7-methanoindene-5-ylidene)bisphenol Polycarbonate 2

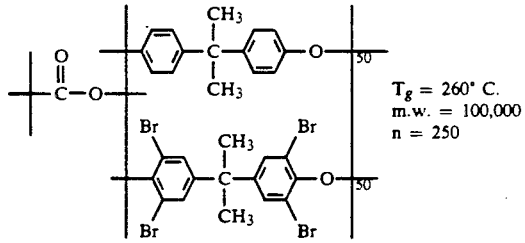

$T_g$ = 260° C.
m.w. = 100,000
n = 250

A polycarbonate derived from 4,4'-isopropylidenediphenol and 4,4'-isopropylidenebis(2,6-dibromophenol)

The Polycarbonate 1 was dissolved in ethyl benzoate as a 15% solution. It had a viscosity of 12,000 cps as measured by a Brookfield LVF Viscometer. The Polycarbonate 2 was dissolved in ethyl benzoate as a 20% solution. It had a viscosity of 700 cps as measured by a Brookfield LVF Viscometer. Each polymer was then screen printed as a 7.6 cm×7.6 cm square.

The coatings were then examined visually for smoothness of the layer on the glass and for the slope at the edge. Ideally, no screen pattern should be evident. The following results were obtained:

| Mesh | Coating Smoothness | | Slope (degrees) | |
| --- | --- | --- | --- | --- |
| | Polycarb. 1 | Polycarb. 2 | Polycarb. 1 | Polycarb. 2 |
| 140 | Good | Good | 2 | 4 |
| 280 | Good | Excellent | 1 | 1 |
| 390 | Excellent | Excellent | 1 | 1 |

The above coatings were then used as dye image-receiving layers for thermal transfer as would be used in making a color filter array.

A dye-donor was prepared consisting of the following layers coated on a 6 μm poly(ethylene terephthalate) support:

1) Dye layer containing the magenta dyes illustrated above (0.27 g/m$^2$), DC-510 Silicone Fluid surfactant (Dow Corning Co.) (0.0003 g/m$^2$), and 0.15 g/m$^2$ of the cyanine infrared absorbing dye illustrated below, in a cellulose acetate-propionate (2.5% acetyl, 48% propionyl) binder (0.41 g/m$^2$) coated from a butanone, cyclopentanone and dimethyl formamide solvent mixture; and 2) Aqueous overcoat layer of 0.5 g/m$^2$ of 9 μm polystyrene beads, 0.047 g/m$^2$ of Woodlok 40-0212 ®, (National Starch Co.), a water-based emulsion polymer of vinyl acetate, and 0.01 g/m$^2$ of surfactant 10G ® (Olin Matheson Corp.), a nonylphenolglycidol glycidol surfactant.

Cyanine Infrared Absorbing Dye

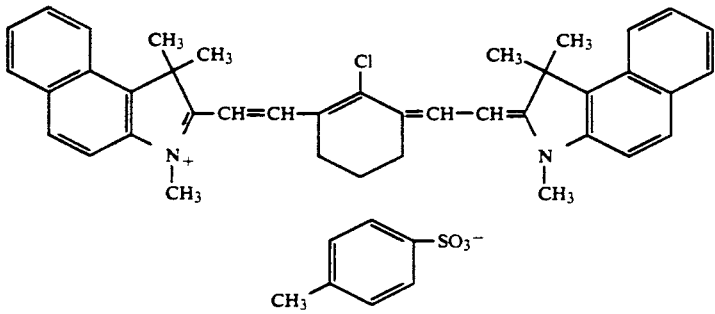

The dye-donor sheet was then placed face-to-face with the receiving element. The assembly was weighted at approximately 6000 g/m$^2$.

A flash unit from EG&G Electro-Optics containing a xenon flash tube, 2200 microfarads, 900 v capacitors, charged to 800 v, was then flashed at 9.5 joules/cm$^2$ to transfer a 1.2 cm×4.2 cm area of magenta dye to the dye image-receiving layer on the glass plate. The transferred image was then fused by exposing to dichloromethane vapors for about 5 minutes.

The glass plate was then coated with a transparent indium tin oxide (ITO) conducting layer (0.2 μm thick) using reactive sputtering of a metal target as described in Example 1 U.S. Pat. No. 4,965,242.

A visual inspection by a scanning electron microscope showed no breaks in the ITO layer at the edge of the underlying polycarbonate layer.

Example 2

Polycarbonate 1 above was dissolved in ethyl benzoate as a 20% solution. It was then screen printed onto a borosilicate glass having a chromium black grid using a Microtronic V ® screen printing machine (Ekra Co.) to print a pattern of four rectangles approximately 9 cm×12 cm on a glass plate having a total printed area of 35 cm×32 cm. The snap-off distance (distance between the screen and the substrate) was 1.75 mm. The squeegee pressure was 2.5 Bar. The print speed was 30 mm/second. A rectangular squeegee was used. The screen was a polyester from NBC Industries Co., with a mesh count of 120 per cm.

After the screen printing, the coating was dried for 30 minutes at 90° C. The dry thickness was 2.1 μm. The coating was examined and seen to have spread at the edges less than 200 μm (or 400 μm in each of two directions). The slope of the edge was less than 2°. The edge of the polycarbonate coating had a lip of less than 0.6 μm.

An image was thermally transferred to the polycarbonate receiver using the materials of Example 1. An overcoat of an acrylate material was then applied to the receiver using flexographic printing according to the process described in NL Application 90.00389 filed Feb. 2, 1990, the disclosure of which is hereby incorporated by reference. An ITO layer was then applied and patterned in the conventional manner by coating a resist, exposing through a mask in a pre-determined pattern, developing and etching. The resist was then removed leaving the patterned ITO. An alignment layer of a polyimide was then applied and cured. The alignment layer was then rubbed in the conventional manner, spacers and seals applied, and the cell filled with liquid crystal material of ZLI-3771 of Merck.

The cell was tested for ITO discontinuities by visual inspection and electrical testing of resistance measurements and showed no discontinuities.

Example 3—Comparative Example-Spin Coating of Receiving Layer

A comparative test was run using the borosilicate glass of Example 2 having the chromium grid lines thereon. Polycarbonate 1 above was spin coated onto the support using a 12% solution in xylene. The spin speed was 30 sec. at 850 rpm and 30 sec. at 300 rpm. It was then dried for one-half hour at 140° C. An aluminum layer was electrolithographically patterned on top of the polycarbonate to provide an auxiliary mask to prevent etching of the polycarbonate in the display area. Before applying the protective overcoat, the remaining aluminum was removed by wet chemical etching. A protective overcoat and ITO layer were then applied as in Example 2. A visual inspection at this point showed ITO breaks caused by severe underetching of the ITO at the edge of the underlying polycarbonate layer.

The results of this example showed that spin coating of the receiving layer followed by etching does not produce useful results.

The invention has been described in detail with particular reference to preferred embodiments thereof, but it will be understood that variations and modifications can be effected within the spirit and scope of the invention.

What is claimed is:

1. A thermally-transferred color filter array element comprising a support having thereon a polymeric dye image-receiving layer containing a thermally-transferred image comprising a repeating pattern of colorants, said polymeric dye image-receiving layer having been applied to said support using screen printing, which results in a smooth coating with edges that have a continuous and smoothly decreasing slope.

2. The color filter array element of claim 1 which is adapted for use in a color electro-optical display device.

3. The element of claim 2 wherein a protective overcoat, transparent conducting layer and a polymeric alignment layer are coated in the order recited over said polymeric dye image-receiving layer.

4. The element of claim 3 wherein said transparent conducting layer is indium tin oxide.

5. The element of claim 1 wherein said polymeric dye image-receiving layer is a polycarbonate having a glass transition temperature greater than about 200° C.

6. The element of claim 5 wherein said polycarbonate is derived from 4,4'-(hexahydro-4,7-methanoindene-5-ylidene)bisphenol.

7. The element of claim 1 wherein said pattern is a mosaic pattern of a set of red, green and blue additive primaries.

8. The element of claim 7 wherein said primary colors are separated from each other by an opaque area.

9. The element of claim 8 wherein said opaque areas form a black grid.

10. The element of claim 1 wherein said thermally-transferred image comprises one or more sublimable dyes.

11. The element of claim 1 wherein said thermally-transferred image is obtained using a high intensity light flash.

12. The element of claim 1 wherein said support is glass.

13. An electro-optical display device comprising a display medium between two supporting substrates wherein one of said substrates comprises the thermally-transferred color filter array element of claim 1.

14. The electro-optical display device of claim 13 in which the display medium is a liquid crystal.

15. A process of forming a color filter array element comprising:
   a) screen printing a polymeric dye image-receiving material onto a support in a pre-determined pattern to form a dye image-receiving element, said screen printing resulting in a smooth coating with edges that have a continuous and smoothly decreasing slope;
   b) image-wise heating a dye-donor element comprising a support having thereon a dye layer; and
   c) transferring a dye image to said polymeric dye image-receiving element; said imagewise-heating being done in such a way as to produce a repeating pattern of colorants to form said color filter array element.

16. The process of claim 15 wherein said pattern is a mosaic pattern of a set of red, green and blue additive primaries.

17. The process of claim 16 wherein said primary colors are separated from each other by an opaque area.

18. The process of claim 17 wherein said opaque areas form a black grid.

19. The process of claim 15 wherein said dye-donor element contains a light-absorbing material.

20. The process of claim 15 wherein a high intensity light flash is used to perform said imagewise-heating step.

21. The process of claim 15 wherein said support is glass.

* * * * *

UNITED STATES PATENT AND TRADEMARK OFFICE
CERTIFICATE OF CORRECTION

PATENT NO. : 5,079,214

DATED : January 7, 1992

INVENTOR(S) : Michael E. Long, Gerardus C.M. de Keyzer, Adriaan W. de Bruijn, Pedro F. Henriette, Antonius H.M. Raaijmaker It is certified that error appears in the above-identified patent and that said Letters Patent is hereby corrected as shown below:

On the title page of the patent, Item [21],

"Appl. No.: 959,509" should -- Appl. No.: 595,509 --.

Signed and Sealed this

First Day of June, 1993

Attest:

MICHAEL K. KIRK

Attesting Officer

Acting Commissioner of Patents and Trademarks